United States Patent
Griffes et al.

(10) Patent No.: US 10,331,376 B2
(45) Date of Patent: *Jun. 25, 2019

(54) SYSTEM AND METHOD FOR ENCRYPTED DISK DRIVE SANITIZING

(71) Applicants: Donald E. Griffes, Pleasant Grove, UT (US); Daniel S. Pedigo, Santaquin, UT (US); Dean V. Nuttall, Lehi, UT (US)

(72) Inventors: Donald E. Griffes, Pleasant Grove, UT (US); Daniel S. Pedigo, Santaquin, UT (US); Dean V. Nuttall, Lehi, UT (US)

(73) Assignee: Whitecanyon Software, Inc., American Fork, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,687

(22) Filed: Aug. 10, 2017

(65) Prior Publication Data
US 2018/0129446 A1    May 10, 2018

Related U.S. Application Data

(63) Continuation of application No. 15/212,572, filed on Jul. 18, 2016, now Pat. No. 9,817,609, which is a (Continued)

(51) Int. Cl.
*G06F 12/14* (2006.01)
*H04L 29/06* (2006.01)
(Continued)

(52) U.S. Cl.
CPC ............ *G06F 3/0652* (2013.01); *G06F 3/067* (2013.01); *G06F 3/0623* (2013.01); *G06F 21/79* (2013.01); *H04L 9/0643* (2013.01); *H04L 9/0822* (2013.01); *H04L 9/0861* (2013.01); *H04L 9/0891* (2013.01); *H04L 9/14* (2013.01); *H04L 9/3226* (2013.01); *G06F 21/6218* (2013.01); *G06F 2221/2107* (2013.01); *G06F 2221/2143* (2013.01); *G11B 20/0021* (2013.01); *H04L 9/08* (2013.01)

(58) Field of Classification Search
CPC ...... G06F 3/0652; G06F 3/067; G06F 3/0623; H04L 9/0891; H04L 9/14; H04L 9/0643; H04L 9/0861; H04L 9/0822; H04L 9/3226
USPC ................... 713/193, 165; 380/44
See application file for complete search history.

(56) References Cited

U.S. PATENT DOCUMENTS 9,396,359 B2 * 7/2016 Griffes .............. G06F 21/79
9,817,609 B2 * 11/2017 Griffes .............. G06F 3/0652
(Continued)

*Primary Examiner* — Aravind K Moorthy
(74) *Attorney, Agent, or Firm* — Clifford H. Kraft

(57) ABSTRACT

A system and method for first changing the encryption key on a self-encrypting disk drive followed by a complete disk wipe. Either process can be separately performed, and they can be performed in any order. In fact, one embodiment of the invention, resets the symmetric key, wipes the disk a predetermined number of times with different predetermined data patterns, and then resets the key a second time. This assures that there is absolutely no way to recover the original key or to read the original plain text data, even if some of it's encrypted values remain on unallocated tracks after wiping. A user can be assured that in milliseconds after starting the wiping process, the entire disk is rendered unreadable and unrecoverable.

6 Claims, 3 Drawing Sheets

Related U.S. Application Data continuation of application No. 14/021,748, filed on Sep. 9, 2013, now Pat. No. 9,396,359.

(51) Int. Cl.

| | |
|---|---|
| *H04L 9/00* | (2006.01) |
| *G06F 3/06* | (2006.01) |
| *G06F 21/79* | (2013.01) |
| *H04L 9/06* | (2006.01) |
| *H04L 9/08* | (2006.01) |
| *H04L 9/14* | (2006.01) |
| *H04L 9/32* | (2006.01) |
| *G11B 20/00* | (2006.01) |
| *G06F 21/62* | (2013.01) |

(56) References Cited

U.S. PATENT DOCUMENTS

| | | | |
|---|---|---|---|
| 2001/0029579 A1 | 10/2001 | Kusakabe et al. | 713/172 |
| 2002/0078026 A1* | 6/2002 | Fergus | G06F 3/0622 |
| 2005/0102312 A1 | 5/2005 | Ohya | G06F 21/6245 |
| 2007/0101055 A1* | 5/2007 | Thorsen | G06F 21/6218 711/112 |
| 2008/0104384 A1* | 5/2008 | Rios | G06F 21/62 713/2 |
| 2009/0083347 A1* | 3/2009 | Haga | G06F 21/6218 |
| 2009/0193205 A1 | 7/2009 | Walczak | 711/160 |
| 2011/0072520 A1* | 3/2011 | Bhansali | G06F 21/572 726/27 |
| 2011/0213899 A1 | 9/2011 | Guo | G06F 21/80 710/7 |
| 2011/0289271 A1* | 11/2011 | Nagpal | G06F 3/0623 711/114 |
| 2012/0239943 A1 | 9/2012 | Okamoto | G06F 21/6218 713/193 |
| 2012/0308011 A1 | 12/2012 | Chencinski et al. | 380/278 |
| 2014/0130188 A1 | 5/2014 | Baryudin et al. | 726/29 |
| 2015/0006910 A1 | 1/2015 | Shapiro | 713/190 |

\* cited by examiner

SYSTEM AND METHOD FOR ENCRYPTED DISK DRIVE SANITIZING

This is a continuation of application Ser. No. 15/212,572 filed Jul. 18, 2016 which was a continuation of application Ser. No. 14/021,748 filed Sep. 9, 2013, now U.S. Pat. No. 9,396,359 issued Jul. 19, 2016. Application Ser. Nos. 15/212,572 and 14/021,748 are hereby incorporated by reference in their entireties.

BACKGROUND

Field of the Invention

The present invention relates generally to the field of disk drive data sanitation and more particularly to a system and method of automatically resetting an encryption key on an encrypted disk drive before wiping.

Description of the Prior Art

Hardware-based full encryption of a disk drive is a technique known in the art to protect data on a disk in a manner that is transparent to any computer or operating system attached to or running the drive. Special circuits on the drive itself perform hardware symmetric encryption of all data being written to the disk and decryption of all data being read from the disk. The encryption is typically a very secure symmetric technique such as the Advanced Encryption Standard (AES) using a 128 or 256 bit key.

Authentication is usually supplied during boot-up as a BIOS event that allows the main key to be made available to the encryption circuitry. The system BIOS may require a password or other security measure. Without this, the drive will not decrypt stored data, and the system cannot boot or otherwise read the hard drive. The drive itself, usually requires an authentication code that may be as long as 32 bits in order to unlock. In most cases, this authentication code is used to decode an encrypted symmetric key using a second encryption technique (that may be identical to the main technique or may be different).

The AES or other key is stored in the hard drive controller hardware or chipset dedicated to encryption. It cannot be read out, and is usually encrypted when not in use. However, it can be changed to a new key with proper authentication. Once the change is made to a new key, none of the data already stored on the disk can be read (more precisely, none of the encrypted, stored data can be correctly decrypted) rendering the disk safe from data loss or readout. A key change is typically accomplished by issuing a cryptographic erase or key reset command to the disk drive after proper authentication. In almost all cases, the disk drive hardware itself generates the new key. That way, the new key is never transferred to or from the outside world in any way, and each new key can be assured to have proper strength (not be a weak key like all ones, all zeros or the like). Some disk drive systems save an encrypted version of the previous symmetric key to allow data recovery in the case of an accidental cryptographic erase; however, this weakens the security and is not widely used. Usually, once a symmetric key is changed, it cannot be recovered by any means. Since it was generated automatically by hardware internal to the disk, it is never transferred outside the disk, and there is no record of it anywhere.

Disk wiping is also known in the art. This is the process of over-writing sectors with known data patterns. It is possible to remove all data from a hard disk thus rendering it safe by writing every sector with a known pattern. Some standards (such as some U.S. Department of Defense standards) require that every sector be over-written three times or some other number of times, and in some cases with a different data pattern each time. This can be very time consuming taking many hours with large disks. Typical disk over-write patterns (on a byte basis) may be alternating patterns such as 0x55 for the first pass, 0xAA for the second pass, and 0x3C for the third pass for example.

There are commercial disk-wiping systems known in the art that can automatically wipe a particular disk according to a particular standard and can be controlled remotely. These systems control the wiping process for start to finish and can guarantee that every sector has been wiped the required number of times.

There are other problems with disk wiping besides the length of time it takes. One of these problems is that some hard disks dynamically allocate tracks to reduce overhead or to remove bad tracks from service. This creates the danger of old plain-text data magnetically (or electronically) residing on a track (or sector) that has been de-allocated and cannot be directly reached by normal addressing. Thus, as a wipe algorithm walks through all possible disk address, it fails to over-write these areas (since they have been dynamically removed from the address space). With some drives, it is possible to locate and wipe these regions; however, with others, there may be no way to be sure that everything has been over-written.

It would be advantageous to have a system and method that could be used with self-encrypting hard disks or other storage devices to quickly make sure that all written data is useless (within milliseconds) no matter where written, and then to also over-write all available sectors a predetermined number of times so that a disk owner is guaranteed there is no useable data left on the device, and that not even the wipe program itself can access any data that was previously stored.

SUMMARY OF THE INVENTION

The present invention is a system and method for first resetting (changing) the encryption key on a self-encrypting disk drive followed by a complete disk wipe. Either process can be separately performed, and they can be performed in any order. One embodiment of the invention resets the symmetric key, wipes the disk a predetermined number of times with different predetermined data patterns, and then resets the key a second time. This assures that there is absolutely no way to recover the original key or to read the original plain text data, even if some of it's encrypted values remain on unallocated tracks after wiping. In addition, a user can be assured that in milliseconds after starting the wiping process, the entire disk is rendered unreadable and unrecoverable. Upon starting the process, the wipe system authenticates itself to the disk controller at a level that allows resetting the main key After changing that key, it then proceeds to wipe every sector the required number of times. Finally, in the double-reset mode, it again changes the key. The disk is safe, clean and in condition for immediate use. Additional formatting can be optionally performed.

DESCRIPTION OF THE FIGURES

Attention is now directed to several drawings that illustrate features of the present invention.

Figure 1:
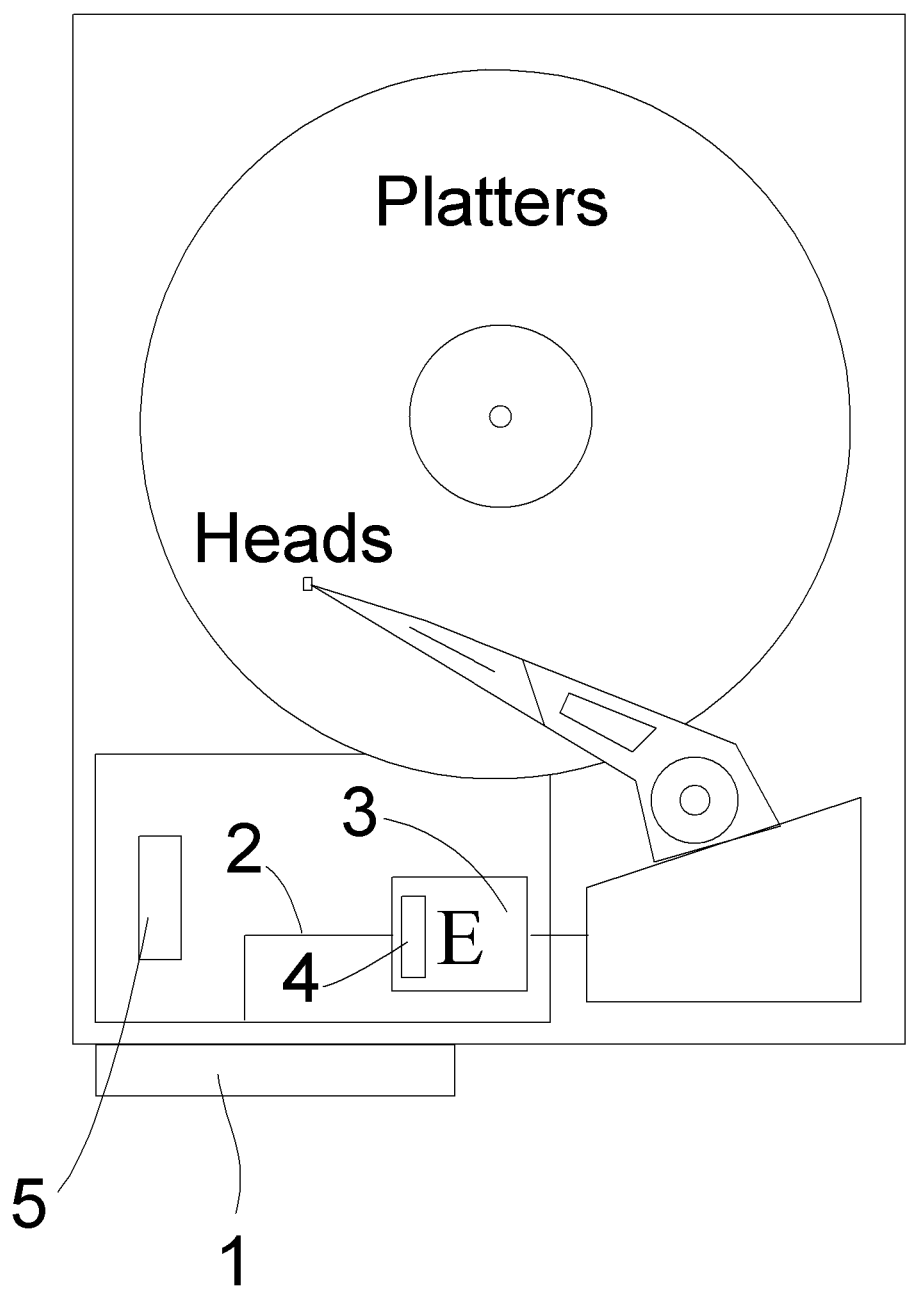
FIG. 1 shows details of a prior art self-encrypting hard disk system.

Several drawings and illustrations are presented to aid in understanding the present invention. The scope of the present invention is not limited to what is shown in the figures.

DESCRIPTION OF PREFERRED EMBODIMENTS

The present invention is a system and method for first resetting (changing) the encryption key on a self-encrypting disk drive followed by a complete disk wipe.

The encryption key used in a self-encrypting hard disk drive is usually a long key used with a high-security encryption method like AES. This key is typically called the Media Encryption Key (MEK). This is a strong key generated automatically as a random or pseudo-random number by the disk hardware/firmware that is typically 128 or 256 bits. Some disk drives may use more than one MEK for different tracks or sectors.

Unlocking the drive for use may require another key typically called a Key Encryption Key (KEK) supplied by the user, BIOS, an operating system or a network. The MEK is encrypted by the KEK, and only the encrypted version of the MEK is stored when the drive is powered off. Also, in most systems, the KEK is never stored in plain text inside the drive. Some drives allow a mode where there is no KEK, or the KEK is not set. In this mode, the drive is always unlocked and appears not to be encrypting even though it is (using the MEK). If a KEK is set, the drive powers up locked (with the MEK only in encrypted form) until the correct KEK is given to the drive by the user.

When a locked self-encrypting drive is powered up, the BIOS typically first sees a shadow disk that is much smaller than the real disk. The shadow disk is usually around 100 megabytes and contains executable software. The software in the shadow disk is read-only and typically requests the KEK from the user to unlock the real disk for use and to decrypt the MEK so the real disk can be read and written to.

Usually, the shadow disk software stores a hash of the KEK so it can recognize if the user provides the correct KEK. When the user enters the correct pass code (either the KEK itself, or a password or other authentication) the shadow disk hashes that pass code or KEK and compares the hash with the stored hash of the KEK. If the two match, the MEK is decrypted using the KEK in what can be a symmetric or asymmetric encryption method, and puts the decrypted MEK into the symmetric encryption-decryption circuit inside the drive (without ever writing it to the magnetic or semiconductor medium). Usually, the BIOS is called from the disk to start again, but it now has the much larger real disk with a capacity in gigabytes rather than megabytes, and the operating system boots normally.

Every hard disk drive (magnetic or semiconductor) has an electrical interface to the computer or controller it is connected to. Most computers connect hard drives through various I/O channels. Every hard disk drive also has a set of commands that are generally executed by loading registers in the disk drive controller. In order to access the disk drive in order to sanitize it, the wipe hardware interface must electrically connect to the drive and be able to issue commands to the drive.

FIG. 1 shows details of a prior art self-encrypting disk drive. The electrical interface 1 connects to an external computer or to a special wipe system. The data path 2 passes through a symmetric encrypt/decrypt chip (or circuit) 3. This chip performs the AES or other symmetric encryption algorithm. The plain text MEK is usually stored in a hardware register 4 during disk use. An authentication interface 5 typically executes firmware (or is hardware) that creates and maintains the shadow disk, keeps a hash of the KEK on the shadow disk, and requests and receives the KEK or other correct authentication upon power-up. This interface 5 also keeps an encrypted version of the MEK available for decrypting and use.

The interface 5 also controls authentication for issuing special commands such as a reset-key (cryptographic erase) command. Since, execution of this command generally renders all the data on the disk permanently unreadable, most systems require special, higher authentication in order to execute this command and other similar commands as opposed to simple read or write commands. In some systems, this command cannot be issued over the regular electrical interface. However, in most systems, commands of this sort can be issued by a higher authority than the user (in some systems called a crypto officer or the like). This is usually simply a user with a different password or a different KEK that must be entered. Authenticating under a lower authority user password only allows disk reads and writes and operational commands, while authenticating under the higher level password allows any operation including a key reset command. With almost all systems, there is no level of authority that can read out the plain text MEK or even the encrypted MEK.

Upon receipt of a reset-key command with the proper authentication, the interface 5 executes a special algorithm that generates a new, strong MEK of the required 128 or 256 bits. This is typically done with a pseudo-random number generator or the like. This new key is first encrypted with the KEK using the secondary encryption technique (which may be identical to the first), and the encrypted version of the MEK is stored on the shadow disk. The generated plain text MEK is than placed in the MEK hardware register 4. At this point, both the old MEK and its encrypted copy are permanently gone on most systems. The disk is still functional for reading or writing; however, any old data will not be readable. Any new written data is encrypted with the new MEK and can be read back with it. The process is almost transparent with the exception that all the old data is now just random bits.

A wipe operation can now begin. However, with self-encrypting disks, there is no way to force the medium write to a particular wipe pattern since all writes are encrypted by the MEK, and all MEKs are internally generated, strong keys. Thus, the actual patterns being written into the medium will be different from any pre-specified patterns. Also, each successive write of the same pattern (say 0x55 at a byte level) will become a different value as the encryption algorithm proceeds. Thus, each sector written with the same pattern will be totally different from every other sector written with that pattern.

Figure 2:
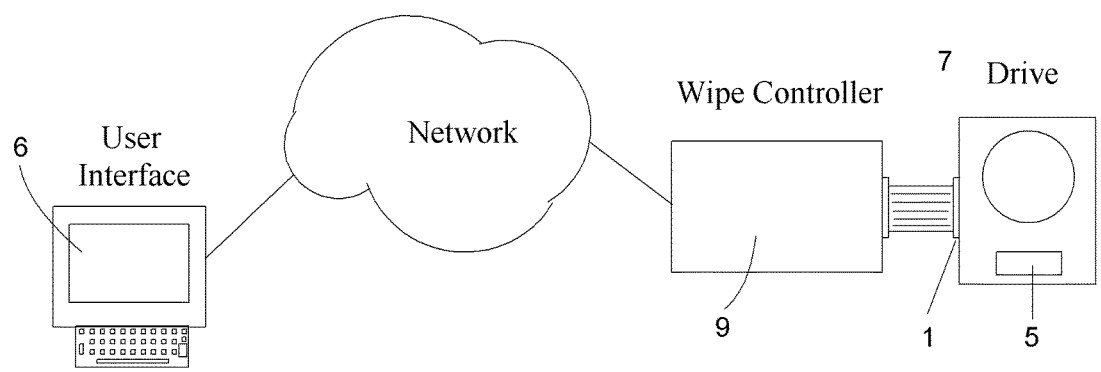
FIG. 2 shows a block diagram of an embodiment of the present invention.

FIG. 2 shows a block diagram of an embodiment of the present invention. A user interface 6 allows the user to choose a particular operation such as reset key, wipe, reset key followed by wipe, wipe followed by reset key, or reset key followed by wipe followed by a second reset key. The user interface 6 may be remote from the actual disk drive being wiped 7 and may communicate over a network 8 such as the Internet. It may be a smartphone or other wireless handheld device executing stored instructions from a wirelessly downloaded application. Alternatively, it may be a remote terminal or personal computer (PC). Thus, any remote computer with proper access can control the process. The wipe controller 9, which can be a PC, server, other computer, microcontroller, or special hardware is attached directly to the disk drive electrical interface 10. The wipe controller 9 sends the actual commands and write data to the disk or storage device interface 1, and reads data back from the disk or storage device. Upon connecting to the drive, the first task this controller 9 must accomplish is to authenticate itself to the drive controller interface 5. The authentication must be at a level where a reset key command (cryptographic erase or cryptographic reset) can be issued.

Once authenticated, the wipe controller 9 sends either the reset key command to the drive, or begins to wipe it as the user wishes. If the particular wipe standard requires read back to verify that the original data has been wiped, that can also be performed. In this mode, a sector or other address is typically written followed by a read back. Some standards do not require read back in order to run faster. Also, some standards require that the entire wipe process be performed more than once (in some cases, up to three times). This can also be done.

The wipe controller 9 can also verify that a key reset has indeed taken place before beginning the wipe operation. This can be easily done by writing a known pattern to a predetermined sector (using the old MEK); issuing a key reset; and then reading back that sector (at that point under the new MEK). The result should be a collection of almost random bits and not the data that was written. This test also verifies that the encryption hardware is functioning, and that data is indeed being encrypted before being written.

The remote terminal or user interface 6 (which may be a cellular telephone) typically runs a graphical user interface (GUI) with menus and command selections known in the art. The remote terminal generally includes key data entry, a display screen which may be a touch screen and possible audio such as voice recognition and a speaker or earphones.

Figure 3:
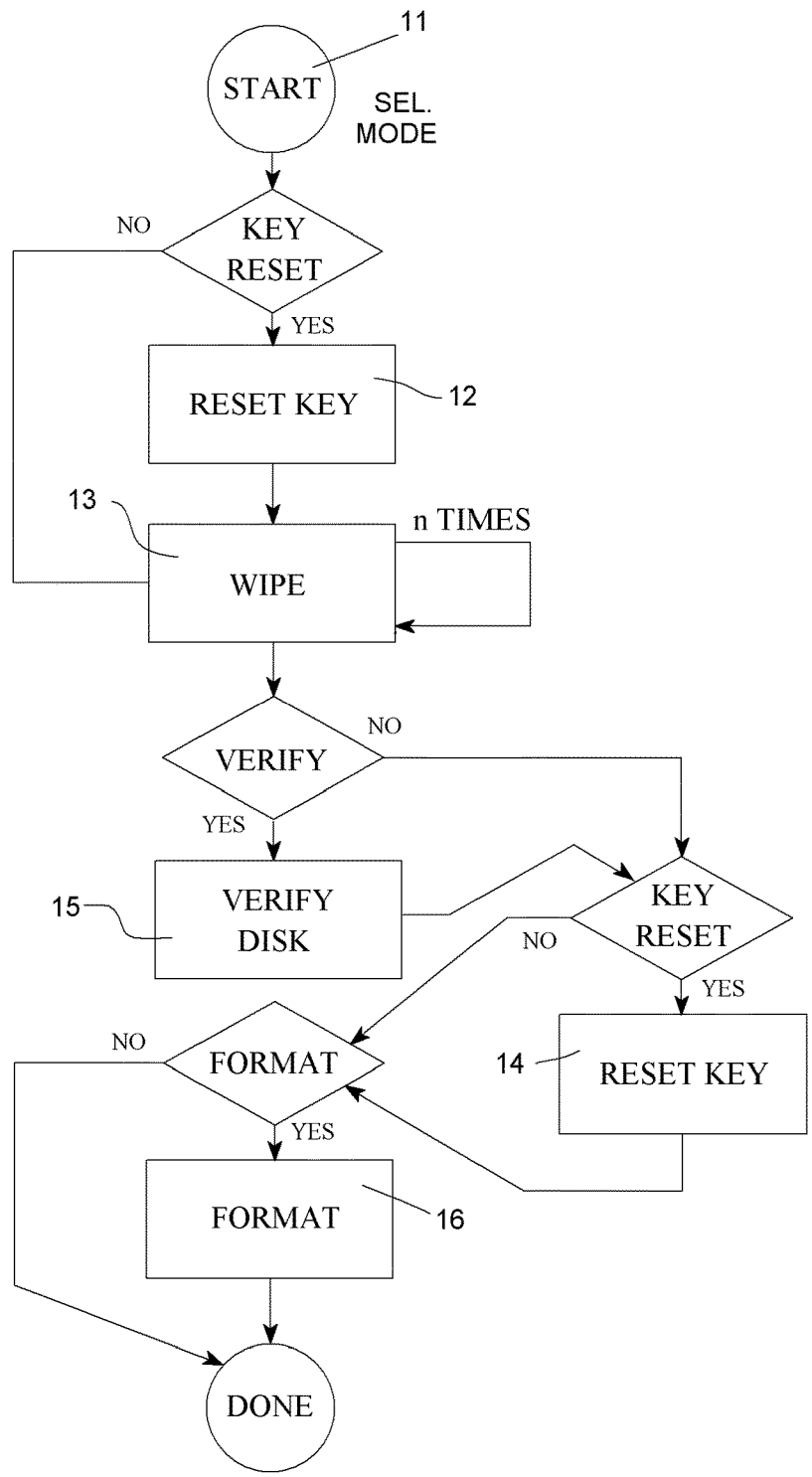
FIG. 3 is a flow chart of a control program applicable to embodiments of the present invention.

FIG. 3 shows a flow chart of an embodiment of the invention. First 11, the user selects a mode of operation. The system next either resets the key 12 or begins a wipe operation 13. If no key reset is desired by the user, the wipe operation begins immediately. If a key reset takes place, the wipe can begin next (if so-selected by the user). The wipe can repeat n times where n is an integer. After that, an optional verification phase 15 can be executed that ascertains to some required probability that the disk is clean, safe and ready to use. Finally, a second key reset 14 can take place if desired. As a final step, optional formatting 16 can be put onto the disk. The user, rather than specifying each step, can alternatively select a particular standard or a particular canned or predetermined routine.

The present invention provides a way to conveniently secure and wipe multiple disks using a local or remote interface. In particular, the system can be controlled from a remote location over a network. The symmetric key (MEK) on a self-encrypting disk, magnetic or semiconductor storage device can be optionally reset before performing wipe operations. It can optionally be reset a second time after wipe operations for additional security. This renders even the wipe data inaccessible. The final result is one or more disks that can be optionally formatted and are ready and safe for use.

Several descriptions and illustrations have been provided to aid in understanding the present invention. One with skill in the art will realize that numerous changes and variations can be made without departing from the spirit of the invention. Each of these changes and variations is within the scope of the present invention.

The invention claimed is:

1. A method of sanitizing a self-encrypting disk drive containing an internal cryptographic key comprising:
   receiving a set of options from a user relating to sanitizing the disk drive;
   issuing a command to the disk drive causing the internal cryptographic key to change value;
   writing a predetermined data pattern to each address of the disk drive;
   reporting to the user that the disk drive has been sanitized according to the options.

2. The method of claim 1 further comprising issuing a second command to the disk drive that causes the internal cryptographic key to change value a second time.

3. The method of claim 2 further comprising providing a user interface configured to communicate the said disk interface over a network.

4. The method of claim 3 wherein the user interface is permits a user to choose options related to sanitizing the disk drive.

5. The method of claim 1 further comprising formatting the disk drive after said predetermined data patterns are written.

6. The method of claim 1 further comprising formatting the disk drive after said cryptographic key changes value a second time.

* * * * *